US009000638B2

United States Patent
Tanaka et al.

(10) Patent No.: US 9,000,638 B2
(45) Date of Patent: Apr. 7, 2015

(54) AC GENERATOR

(71) Applicants: Kazunori Tanaka, Tokyo (JP); Toshiyuki Oonishi, Tokyo (JP); Kyoko Higashino, Tokyo (JP)

(72) Inventors: Kazunori Tanaka, Tokyo (JP); Toshiyuki Oonishi, Tokyo (JP); Kyoko Higashino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 171 days.

(21) Appl. No.: 13/767,187

(22) Filed: Feb. 14, 2013

(65) Prior Publication Data
US 2014/0111036 A1    Apr. 24, 2014

(30) Foreign Application Priority Data
Oct. 24, 2012   (JP) .................................. 2012-234365

(51) Int. Cl.
*H02K 19/36*   (2006.01)
*H02K 11/02*   (2006.01)

(52) U.S. Cl.
CPC ............ *H02K 19/365* (2013.01); *H02K 11/024* (2013.01)

(58) Field of Classification Search
USPC ........................................... 310/68 D, 43, 89
See application file for complete search history.

(56) References Cited

U.S. PATENT DOCUMENTS

2007/0176501 A1* 8/2007 Nishimura et al. .......... 310/68 R
2009/0243407 A1* 10/2009 Kato et al. ..................... 310/62
2012/0313467 A1* 12/2012 Omae et al. .................... 310/71

FOREIGN PATENT DOCUMENTS

| JP | 4186838 B2 | 11/2008 |
| JP | 2011-130639 A | 6/2011 |
| JP | 2011-181824 A | 9/2011 |

OTHER PUBLICATIONS

Japanese Office Action (Preliminary Notice of Reasons for Rejection), dated Dec. 10, 2013, Patent Application No. 2012-234365.

* cited by examiner

*Primary Examiner* — Dang Le
(74) *Attorney, Agent, or Firm* — Sughrue Mion, PLLC; Richard C. Turner

(57) ABSTRACT

Provided is a vehicle AC generator which enables the common use of components and the use of the same molding die for molded bodies to enable a significant reduction in fabrication cost. The vehicle AC generator includes a molded body (45). On one surface side of the molded body, a capacitor body (43) including a capacitor element built therein is electrically connected to an insert conductor. On another surface side of the molded body, a resistor (44) is electrically connected to the insert conductor only when a device main body is provided outside of the AC generator, and the device main body is electrically connected to the insert conductor only when the device main body is provided in the AC generator.

11 Claims, 12 Drawing Sheets

AC GENERATOR

BACKGROUND OF THE INVENTION

1. Field of the Invention

The present invention relates to an AC generator which can be used in common for both the case where a device main body having a function of regulating the magnitude of an output voltage is provided in the AC generator and the case where the device main body is provided outside of the AC generator.

2. Description of the Related Art

A vehicle AC generator mounted in an engine room is driven to be rotated by an engine to charge a battery and supply electric power to an electric load mounted in the vehicle. It is a voltage-regulating device that controls an output voltage of the vehicle AC generator in accordance with a charged state of the battery and electric power demanded by the electric load.

As the voltage-regulating device configured as a component provided in the vehicle AC generator, the following one is known. A device main body having a voltage-regulating function for controlling the output voltage and a capacitor element are mounted in a continuous space inside a holder. Then, an insulating resin is injected at one position to simultaneously fix the device main body and the capacitor element (for example, see Japanese Patent Application Laid-open No. 2011-130639 (FIG. 4)).

In the case of the above-mentioned voltage-regulating device, when the resin is injected, a heat sink bonded to a heat-generating portion of the device main body through a thermally-conductive member also functions as a bottom cover. Therefore, the voltage-regulating device described above has the effects of reducing the number of components to be fixed and shortening fabrication time.

On the other hand, there also exists a so-called regulator-less vehicle AC generator as one type of the vehicle AC generator. In the vehicle AC generator without a regulator, the device main body is not provided on the generator side but provided in a control device (ECU) on the vehicle side.

In the mainstream vehicle AC generator including the device main body provided on the generator side, the voltage-regulating device, which is a component incorporated therein, is shared, to the extent possible, for most of a wide variety of types of generators having the same connector structure.

However, the vehicle AC generator without a regulator does not include the device main body corresponding to a main component of the voltage-regulating device and therefore, cannot be configured with the shared components. Thus, the voltage-regulating device is conventionally configured with components having individual specifications.

The vehicle AC generator described in Japanese Patent Application Laid-open No. 2011-130639 cited above includes the device main body and the capacitor element which are mounted in the continuous space inside the holder, and the insulating resin is injected at one position. If the same holder is used for the vehicle AC generator without a regulator so as to be shared and the device main body is removed from the holder, a heat sink, which abuts against the device main body to dissipate the heat of the device main body, is also removed. Specifically, the heat sink, which is also used as a resin-receiving cover, is also removed. Therefore, in this state, the resin cannot be sealed within the holder, resulting in a state in which the capacitor element and terminal connection portions are exposed.

Moreover, the mounting of the heat sink only for the purpose of receiving the resin is not accepted in terms of reduction in cost and reduction in the number of components. Accordingly, there is a problem in that the common use of the components and reduction in fabrication cost are not pushed forward.

SUMMARY OF THE INVENTION

The present invention has been made to solve the problems described above and therefore, has an object to provide an AC generator which enables the common use of components of a voltage-regulating device and enables the use of the same molding die for molded bodies for the most part of each molded body both in the case where a device main body having a function of regulating the magnitude of an output voltage is provided in the AC generator and in the case where the device main body is provided outside of the AC generator, thus being capable of significantly reducing fabrication cost.

An AC generator according to the present invention includes: a stator around which a stator winding is wound; a rotor around which a rotor winding is wound, for inducing an AC electromotive force in the stator winding by rotational driving thereof; a rectifier for converting the AC electromotive force into a DC output voltage; and a molded body including an insert conductor, the molded body having approximately the same outer shape both in a case where a device main body having a function of regulating a magnitude of the DC output voltage is provided in the AC generator and a case where the device main body is provided outside of the AC generator, in which: on one surface side of the molded body, a capacitor body including a capacitor element built therein is electrically connected to the insert conductor; and on another surface side of the molded body, a resistor is electrically connected to the insert conductor only when the device main body is provided outside of the AC generator, and the device main body is electrically connected to the insert conductor only when the device main body is provided in the AC generator.

According to the AC generator of the present invention, on the one surface side of the molded body, the capacitor body including the capacitor element built therein is electrically connected to the insert conductor, On the another surface side of the molded body, resistor is electrically connected to the insert conductor only when the device main body is provided outside of the AC generator, and the device main body is electrically connected to the insert conductor only when the device main body is provided in the AC generator. Therefore, the same components can be shared. Moreover, the same molding die can be used for molded bodies for the most part of each molded body. Thus, the fabrication cost can be significantly reduced.

DETAILED DESCRIPTION OF THE PREFERRED EMBODIMENTS

In the following, vehicle AC generators according to embodiments of the present invention are described referring to the accompanying drawings. In the figures, the same or corresponding members and parts are denoted by the same reference symbols for description.

First Embodiment

Figure 1:
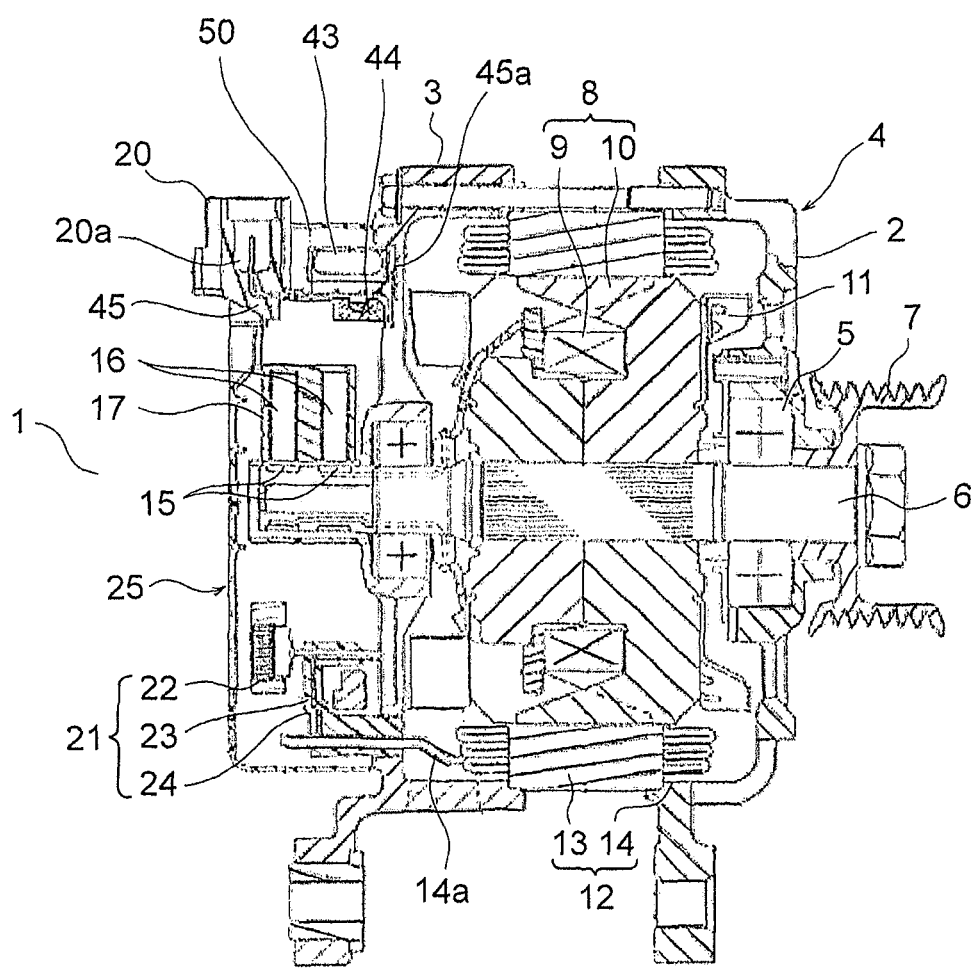
FIG. 1 is a sectional side view illustrating a vehicle AC generator (of a type without a regulator) according to a first embodiment of the present invention.
Figure 2:
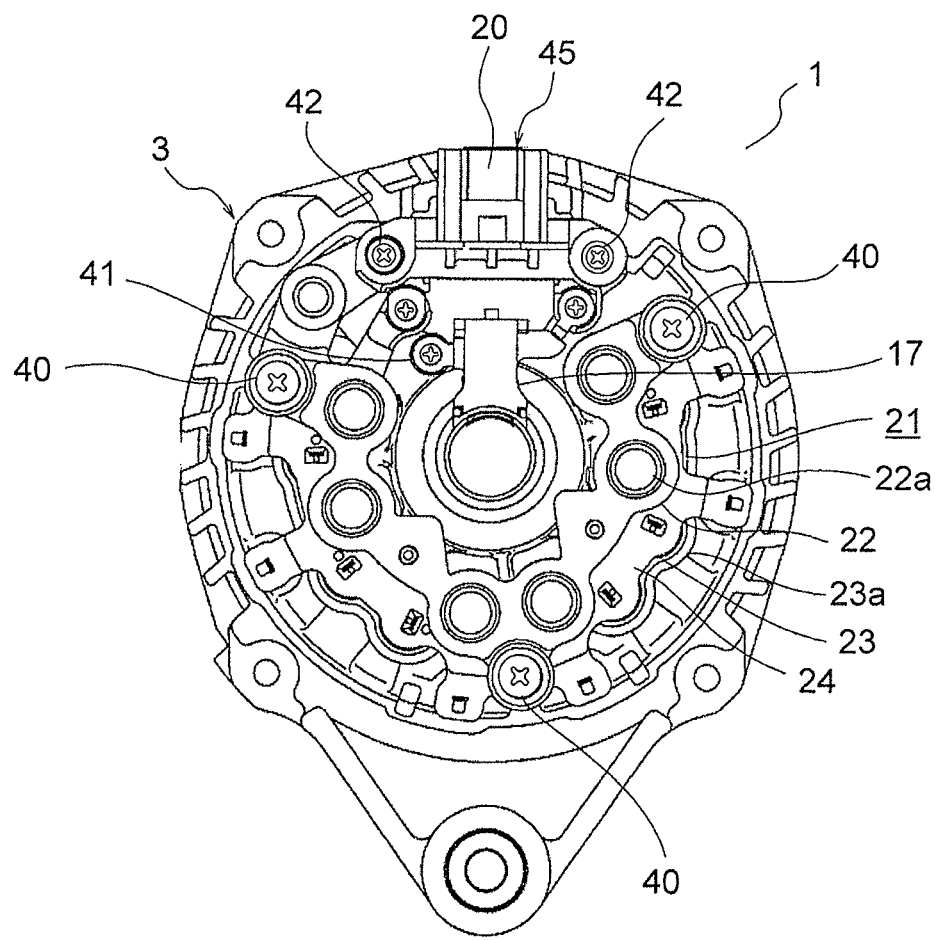
FIG. 2 is a rear view of the vehicle AC generator illustrated in FIG. 1 in a state in which a protective cover is removed.
Figure 3:
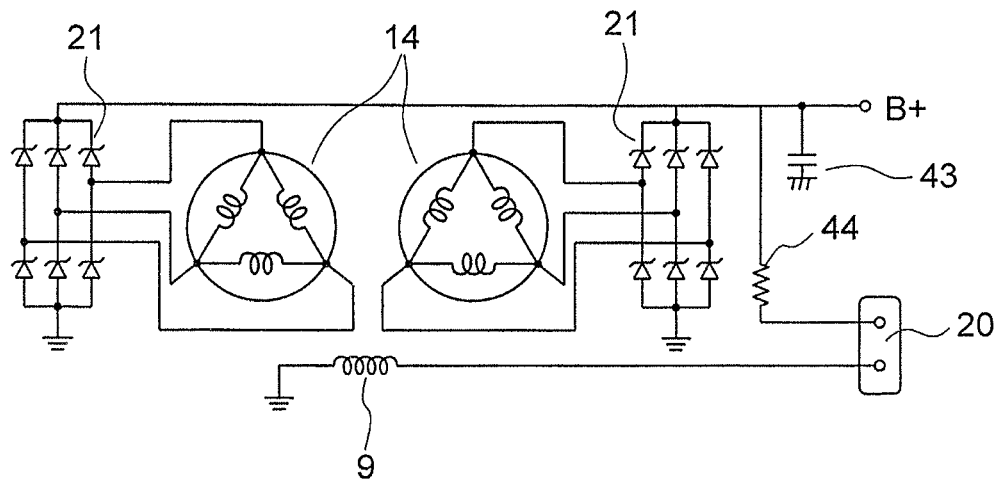
FIG. 3 is an electric circuit diagram of the vehicle AC generator illustrated in FIG. 1.

FIG. 1 is a sectional side view illustrating a vehicle AC generator (of a type without a regulator) according to a first embodiment of the present invention. FIG. 2 is a rear view of the vehicle AC generator illustrated in FIG. 1 in a state in which a protective cover 25 is removed. FIG. 3 is an electric circuit diagram of the vehicle AC generator illustrated in FIG. 1.

The vehicle AC generator 1 includes a casing 4, a shaft 6, a pulley 7, a rotor 8, fans 11, a rotor 8, a stator 12, a pair of slip rings 15, and a pair of brushes 16. The casing 4 includes a front bracket 2 and a rear bracket 3, each being made of aluminum and having an approximately bowl-like shape. The shaft 6 is rotatably supported by the casing 4 through an intermediation of a pair of bearings 5. The pulley 7 is firmly fixed to an end portion of the shaft 6, which extends toward the front side of the casing 4. The rotor 8 is fixed to the shaft 6 and is provided inside the casing 4. The fans 11 are respectively fixed onto both end surfaces of the rotor 8 in an axial direction. The stator 12 is fixed to the casing 4 so as to surround the rotor 8. The pair of slip rings 15 is fixed to an extended portion of the shaft 6, which extends toward the rear side of the casing 4, and supplies a current to the rotor 8. The brushes 16 respectively slide against surfaces of the slip rings 15.

The vehicle AC generator 1 further includes a brush holder 17, the regulating-device half body 50, a connector 20, a rectifier 21, and the protective cover 25. The brush holder 17 houses the brushes 16 therein. The regulating-device half body 50 is provided on a radially outer side of the brush holder 17 and includes a capacitor body 43, a resistor 44, and a molded body 45. The capacitor body 43 includes a capacitor element built therein for absorbing noise generated in a circuit. The connector 20 performs input/output of a signal to/from an external device (not shown) such as a battery. The rectifier 21 is provided on the rear side of the rear bracket 3 and converts an AC electromotive force generated by the stator 12 into a DC output voltage. The protective cover 25 is mounted to the rear bracket 3 so as to cover the brush holder 17 and the rectifier 21.

The rotor 8 is a Lundell-type rotor. The rotor 8 includes a field winding 9 and a pole core 10, which is provided so as to cover the field winding 9. An exciting current is caused to flow through the field winding 9 to generate a magnetic flux. By the generated magnetic flux, magnetic poles are formed in the pole core 10. The stator 12 includes a stator core 13 and a stator winding 14. The stator core 13 has a cylindrical shape. The stator winding 14 is wound around the stator core 13 to induce the AC electromotive force by a change in the magnetic flux generated by the field winding 9 by the rotation of the rotor 8. The stator 12 is provided so as to surround the rotor 8, while the stator core 13 is interposed between the front bracket 2 and the rear bracket 3 so that an open end of the front bracket 2 and an open end of the rear bracket 3 are located to respectively face both ends of the stator core 13 in an axial direction.

The rectifier 21 includes a positive-electrode side heat sink 22, a negative-electrode side heat sink 23, and a circuit board 24. A plurality of positive-electrode side rectifying elements 22a are mounted on the positive-electrode side heat sink 22, whereas a plurality of negative-electrode side rectifying elements 23a are mounted on the negative-electrode side heat sink 23. The positive-electrode side heat sink 22 and the negative-electrode side heat sink 23 are laminated across the circuit board 24. In this manner, the rectifier 21 has an approximately C-shape as viewed from the axial direction. The positive-electrode side rectifying elements 22a and the negative-electrode side rectifying elements 23a are connected through the circuit board 24 so as to form a predetermined bridge circuit.

The rectifier 21 configured as described above is arranged, on the outer circumferential side of the slip rings 15, in an arc shape pattern about the shaft 6 as a center on a plane orthogonal to an axial core of the shaft 6 and is fixed by fastening with screws 40 onto an outer end surface of the rear bracket 3. Then, a lead wire 14a of the stator winding 14 is drawn from the rear bracket 3 to be connected to a terminal of the circuit board 24. In this manner, the rectifier 21 and the stator winding 14 are electrically connected to each other.

The brush holder 17 is provided in a space formed by the approximately C-shape of the rectifier 21 and is fixed by fastening with screws 41 onto an outer end surface of the rear bracket 3. Similarly, the regulating-device half body 50 is provided together with the connector 20 provided integrally therewith at a position of a distal end of the rectifier 21, which has the approximately C-shape, on the radially outer side of the brush holder 17.

Figure 4:
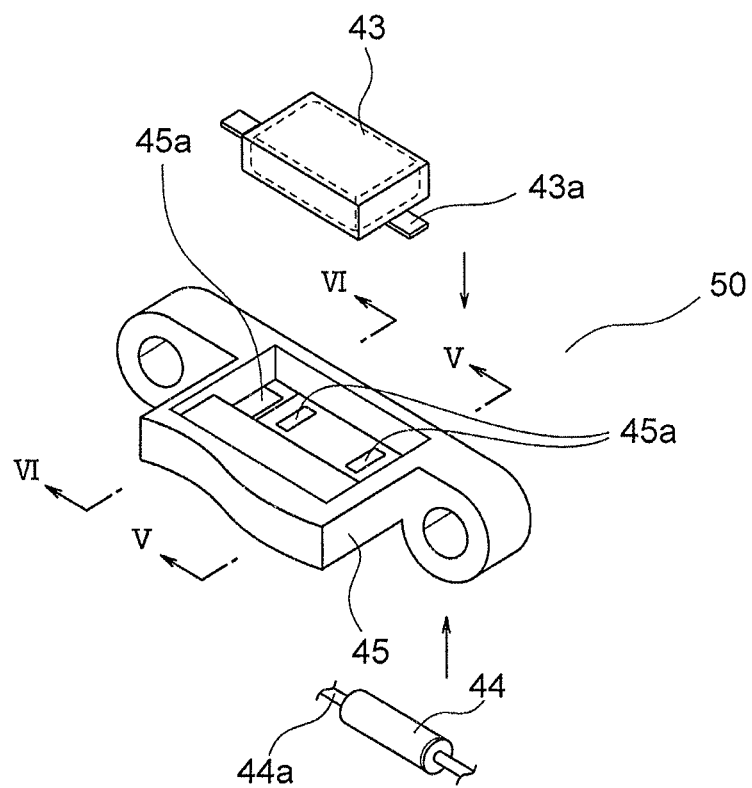
FIG. 4 is an exploded perspective view illustrating a regulating-device half body illustrated in FIG. 4.
Figure 5:
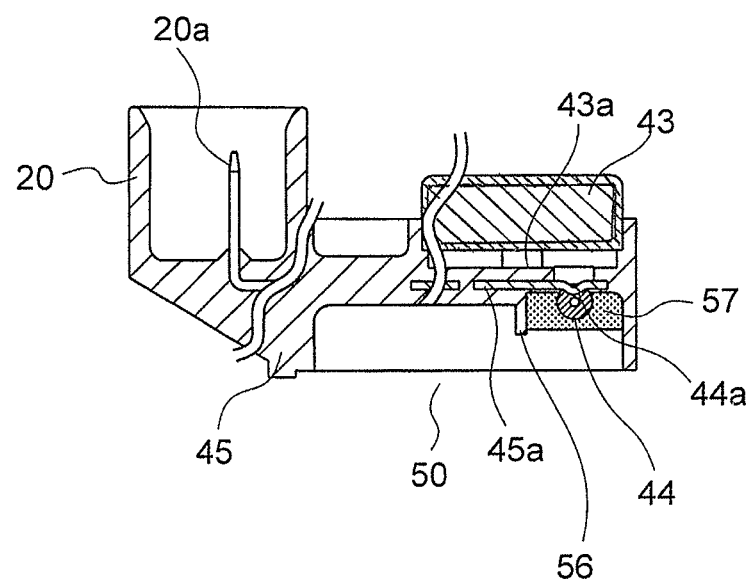
FIG. 5 is a sectional view taken along line V-V of FIG. 4.
Figure 6:
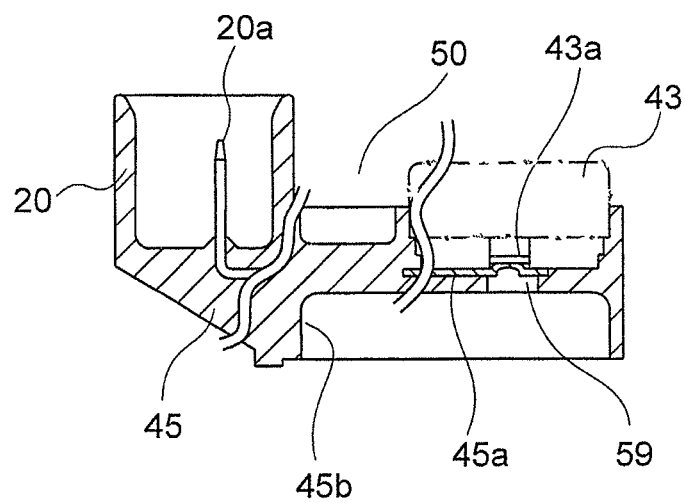
FIG. 6 is a sectional view taken along line VI-VI of FIG. 4.

FIG. 4 is a perspective view illustrating a regulating-device half body illustrated in FIG. 1. FIG. 5 is an exploded perspective view illustrating a regulating-device half body illustrated in FIG. 4. FIG. 6 is a sectional view taken along line VI-VI of FIG. 1.

The regulating-device half body 50 includes the molded body 45, the capacitor body 43, and the resistor 44. The molded body 45 is obtained by molding a plurality of terminals 45a corresponding to insert conductors. The terminals 45a include first terminals and second terminals. The capacitor body 43 has terminals 43a which are electrically connected to the first terminals included in the terminals 45a. The resistor 44 has leads 44a which are electrically connected to the second terminals included in the terminals 45a.

Portions of the terminals 45a inserted into the molded body 45, which are not subjected to welding, other than a connector terminal 20a exposed inside the connector 20 integrally provided therewith and a ground portion (indicated by E1 in FIGS. 8 and 9) are basically molded. Both surfaces of the terminals 45a inserted into the molded body 45 are exposed at welded portions.

The capacitor body 43 and the resistor 44 are divided into both surfaces of the molded body 45. The capacitor body 43 is provided on one surface of the molded body 45. The resistor 44 is provided on another surface of the molded body 45. A concave portion 45b is provided on another surface thereof. A partitioning portion 56 is closely formed on the side of the resistor 44.

The molded body 45 is fixed by fastening with screws 42 onto an outer end surface of the rear bracket 3.

Figure 7:
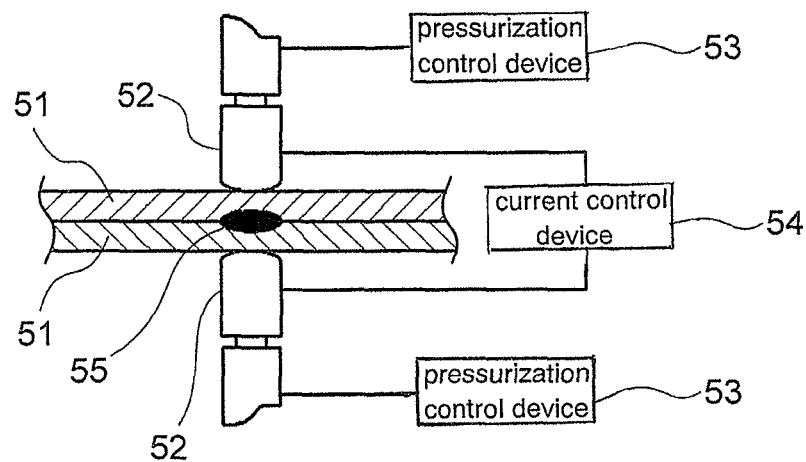
FIG. 7 is a schematic view explaining direct welding.

The terminals 43a of the capacitor body 43 and the leads 44a of the resistor 44 are respectively overlapped with the terminals 45a of the molded body 45 so as to be electrically connected to each other by direct welding illustrated in FIG. 7.

The direct welding is a method performed as follows. Two metal plates 51 are first overlapped with each other. A current controlled by a current control device 54 is caused to flow between a pair of electrodes 52, while a portion at which the metal plates 51 are to be connected is pressurized from above and below by the pair of electrodes 52 with a pressure controlled by a pressurization control device 53. In this manner, by using resistance heat-generation of the metal plates 51, welded portions 55 are formed at contact points.

The terminals 43a of the capacitor body 43 and the leads 44a of the resistor 44 are respectively connected to the terminals 45a of the molded body 45 by the direct welding. Projections are formed on the portions where the terminals 45a are connected. As a result, a highly reliable welded structure is obtained.

Further, the welded portions of the capacitor body 43 are arranged outside of the welded portions of the resistor 44, as viewed in plan. Therefore, the capacitor body 43 and the resistor 44 do not interfere with each other in welding work, the components having a compact configuration with good workability can be obtained.

After the welding, a filling material 57 is provided inside a space formed by the partitioning portion 56 which is provided on the side of the resistor 44. As a result, the reliability of both the fixation of the resistor 44 to the molded body 45 and the portion, at which the lead 44a and the second terminal included in the terminals 45a are connected, are ensured.

Figure 8:
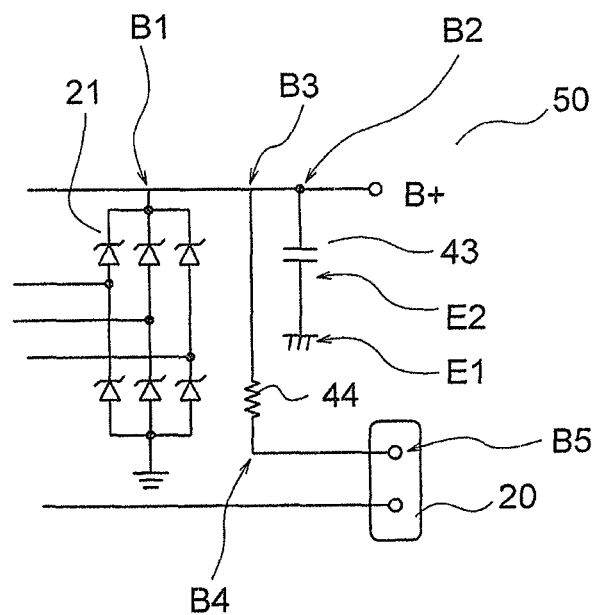
FIG. 8 is an electric circuit diagram illustrating a regulating-device half body.
Figure 9:
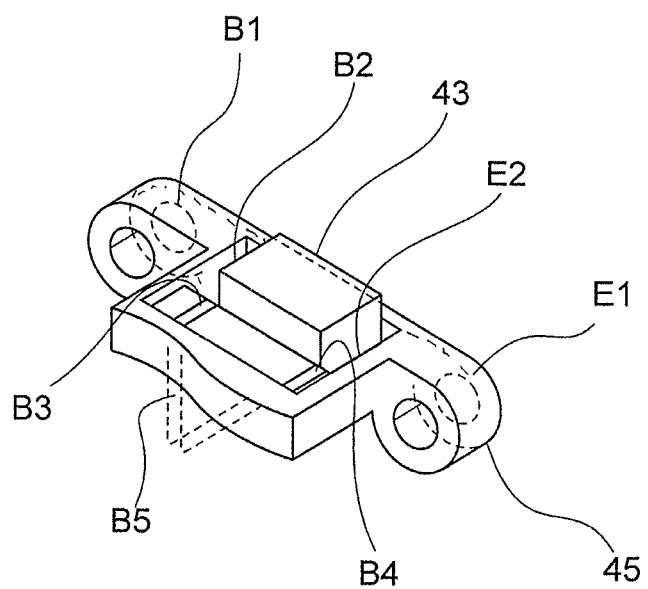
FIG. 9 is a perspective view illustrating the insert conductors of the molded body.

FIG. 8 is an electric circuit diagram illustrating the regulating-device half body 50. FIG. 9 is a perspective view illustrating the insert conductors of the molded body 45. In FIG. 9, dotted lines indicate the terminals 45a corresponding to the insert conductors.

Contacts B1 to B5, E1, and E2 of the regulating-device half body 50 illustrated in the electric circuit diagram of FIG. 8 respectively correspond to portions B1 to B5, E1, and E2 of the terminals 45a illustrated in FIG. 9.

In this embodiment, only the space around the resistor 44 which is separated by the partitioning portion 56 is filled with the filling material 57. Specifically, the filling material 57 is not provided around the capacitor body 43 and the terminal 43a, which is also advantageous in terms of cost.

An example where the filling material 57 is not provided around the capacitor body 43 and the terminal 43a is illustrated in, for example, FIG. 5 of Japanese Patent No. 4186838.

Specifically, FIG. 5 of the above-mentioned patent is a sectional view of a regulator of a vehicle power generator. As can be understood from FIG. 5, terminals themselves, which are provided at two positions, that is, on the high-potential side and the low-potential side of a capacitor element, are separated away from each other. In addition, the terminal on the low-potential side is grounded. The terminals of the capacitor element on the high-potential side and the low-potential side are exposed without being covered with a filling material.

The filling material can also be individually provided around the capacitor body 43 and the terminal 43a.

The vehicle AC generator 1 (of the type without a regulator), into which the regulating-device half body 50 is incorporated, has been described. Next, a vehicle AC generator 1A (of a type with a regulator), into which a voltage-regulating device 58 is incorporated, is described.

Figure 10:
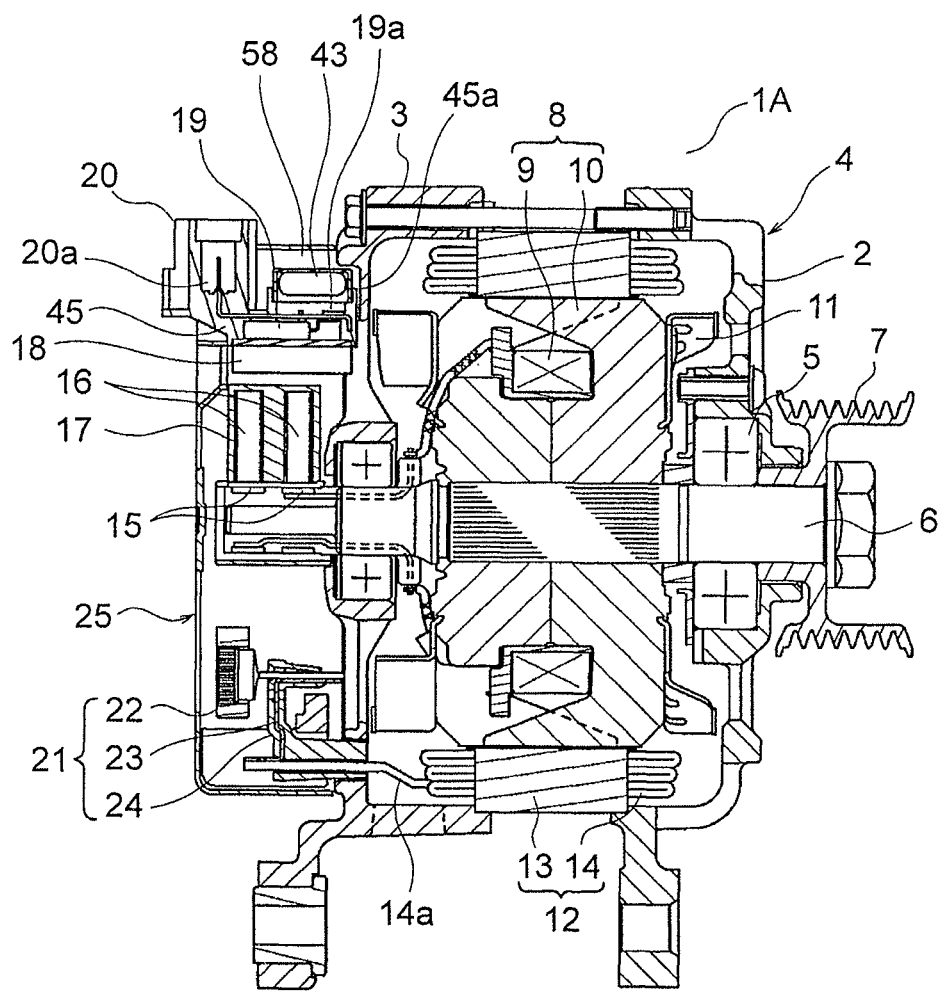
FIG. 10 is a sectional side view illustrating the vehicle AC generator (of a type with a regulator)
Figure 11:
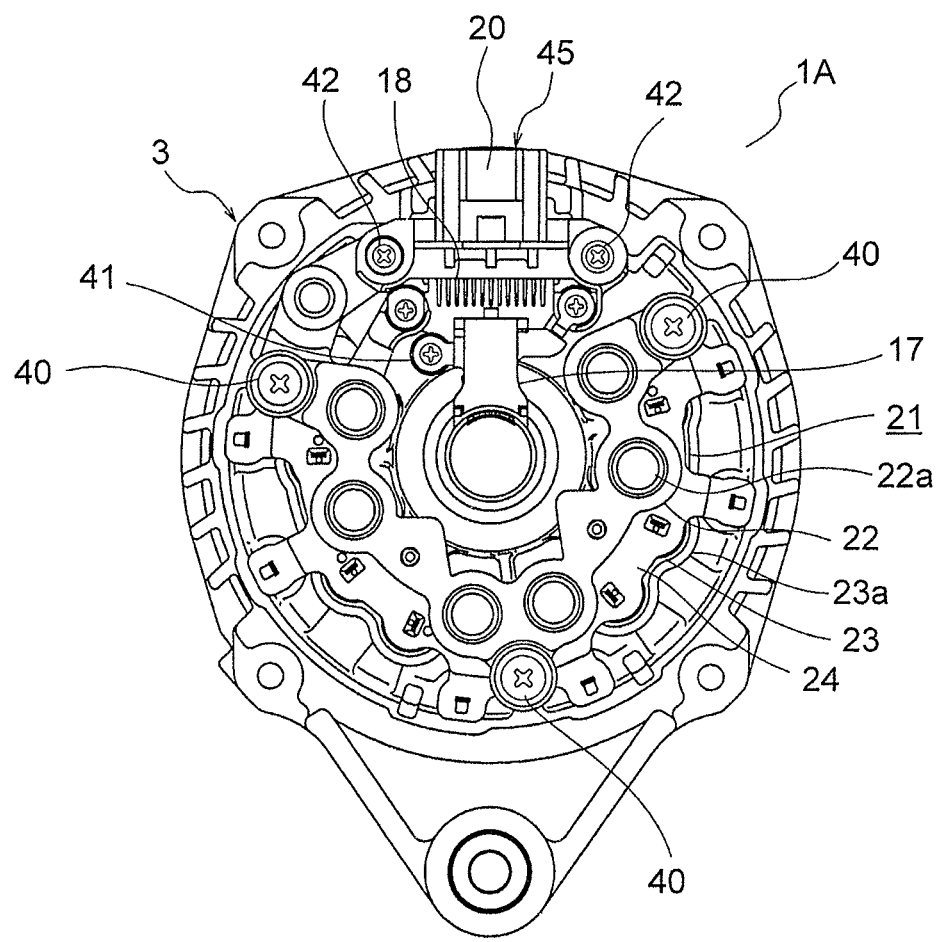
FIG. 11 is a rear view of the vehicle AC generator illustrated in FIG. 10 in a state in which the protective cover is removed therefrom.
Figure 12:
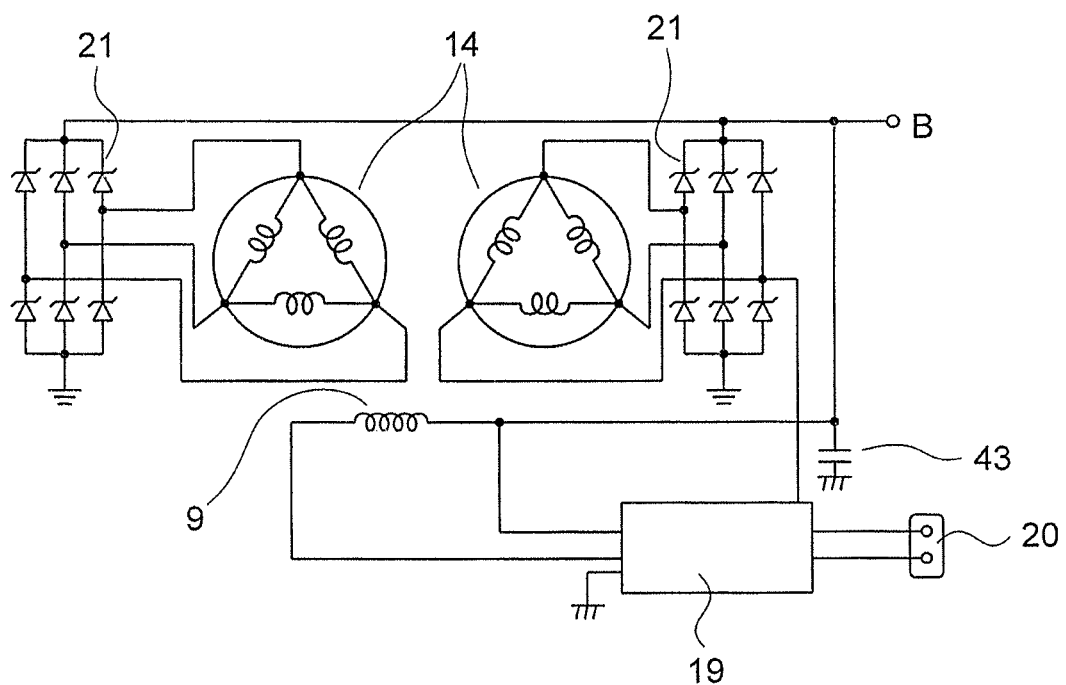
FIG. 12 is an electric circuit diagram of the vehicle AC generator illustrated in FIG. 10.

FIG. 10 is a sectional side view illustrating the vehicle AC generator 1A. FIG. 11 is a rear view of the vehicle AC generator 1A illustrated in FIG. 10 in a state in which the protective cover 25 is removed therefrom. FIG. 12 is an electric circuit diagram of the vehicle AC generator 1A illustrated in FIG. 10.

Figure 13:
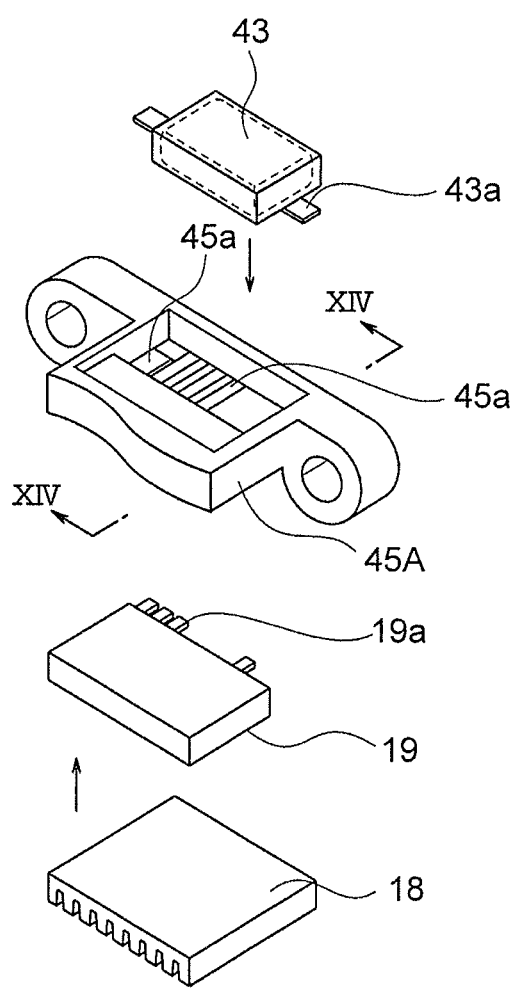
FIG. 13 is an exploded perspective view illustrating the voltage-regulating device in FIG. 10.
Figure 14:
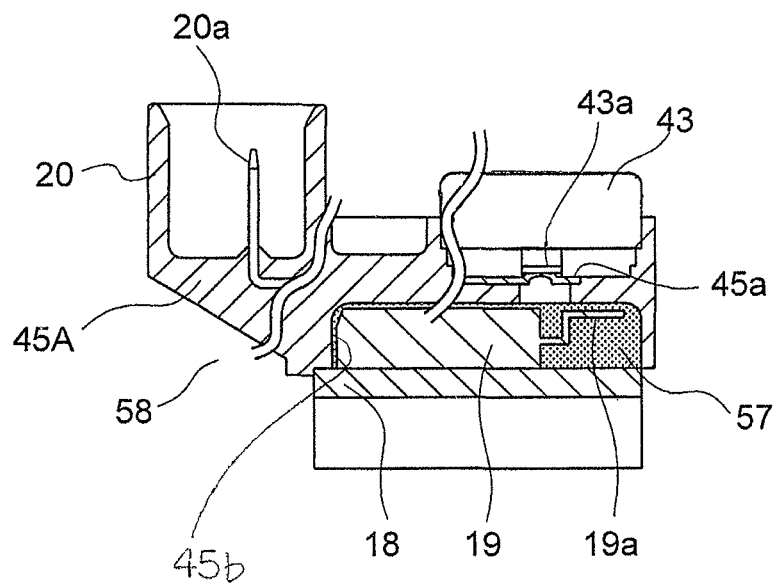
FIG. 14 is a sectional view taken along line XIV-XIV of FIG. 13.

As illustrated in FIGS. 13 and 14, the voltage-regulating device 58 includes a molded body 45A, the capacitor body 43, a device main body 19, and a heat sink 18. The molded body 45A is obtained by molding the plurality of terminals 45a corresponding to the insert conductors. The capacitor body 43 is provided on one surface side of the molded body 45A and has the terminals 43a electrically connected to the first terminals included in the terminals 45a. The device main body 19 is provided on another surface side of the molded body 45A and has terminals 19a electrically connected to the second terminals included in the terminals 45a. The device main body 19 has a function of regulating the magnitude of a voltage output. The heat sink 18 is provided so as to abut against a bottom surface of the device main body 19.

The terminals 45a, which are inserted into the molded body 45A, are similar to those of the vehicle AC generator 1 described above. Both surfaces of the terminals 45a are exposed at the welded portions.

The concave portion 45b is formed on the another surface of the molded body 45A.

The molded body 45A is fixed by fastening with the screws 42 onto the outer end surface of the rear bracket 3.

For the voltage-regulating device 58 having the configuration described above, the device main body 19 is inserted into the concave portion 45b of the molded body 45A. The above-mentioned exposed portions of the second terminals included in the terminals 45a of the molded body 45A and the terminals 19a of the device main body 19 are overlapped with each other and then are electrically connected to each other by the direct welding.

Next, the molded body 45A is turned upside down. The terminals 43a of the capacitor body 43 and the above-mentioned exposed portions of the first terminals included in the terminals 45a of the molded body 45A are overlapped with each other and then are electrically connected to each other by the direct welding.

Further, the welded portions of the capacitor body 43 are arranged outside of the welded portions of the device main body 19, as viewed in plan. Therefore, the capacitor body 43 and the device body 19 do not interfere with each other in welding work, the components having a compact configuration with good workability can be obtained.

Thereafter, the heat sink 18 is provided so as to abut against the device main body 19 through a thermally-conductive member therebetween. In addition, the heat sink 18 is firmly fixed to the molded body 45A to cover the concave portion 45b.

As a final step, the concave portion 45b is injected with the filling material 57.

Each of the terminals 19a has a small width, and a distance between the terminals 19a is also small. In addition, each of the terminals 45a corresponding to the terminals 19a has a smaller width than the other portions, and a distance between the terminals 45a is small.

For the above-mentioned reason, the filling material 57 is provided to substantially cover the periphery of electrically connected portions of the terminals 19a with an insulating resin so as to protect the electrically connected portions from water, adhesion of a foreign substance, or the like at the time of mounting in the vehicle.

When the filling material 57 is required to be provided around the capacitor body 43 and the terminals 43a, respectively, this can be easily achieved by increasing the amount of injection of the filling material 57 until the filling material 57 reaches the terminals 43a located above the terminals 19a of the device main body 19, which are illustrated in FIG. 14.

Moreover, the molded body 45 for the regulating-device half body 50, which is illustrated in FIG. 5, and the molded body 45A for the voltage-regulating device 58, which is illustrated in FIG. 14, have substantially the same outer shape, although there is a difference in existence of the partitioning portion 56.

The molded bodies 45 and 45A differs from each other only in the configuration of the terminals 45a corresponding to the insert conductors. Therefore, the same molding die can be used for most parts of the molded bodies for both the types of vehicle AC generators, that is, the so-called vehicle AC generator of the type with a regulator and vehicle AC generator of the type without a regulator.

As described above, according to the vehicle AC generators 1 and 1A of this embodiment, on the one surface side of each of the molded body 45 and 45A having the same outer shape, the capacitor body 43 including the capacitor element built therein is electrically connected to the insert conductors. On the another surface side, the resistor 44 is electrically connected to the insert conductors only when the device main body 19 is provided outside of the vehicle AC generator 1, and the device main body 19 is electrically connected to the insert conductors only when the device main body 19 is provided in the vehicle AC generator 1A.

Therefore, the molded bodies 45 and 45A, which are substantially the same, can be easily used both for the vehicle AC generator 1 of the type without a regulator and the vehicle AC generator 1A of the type with a regulator.

The molded bodies 45 and 45A have substantially the same outer shape. The same molding die can be used for most parts of the molded bodies. Therefore, fabrication cost can be significantly reduced.

Further, the resistor 44 or device main body 19 is disposed within the project area of the capacitor body 43 and housed in the concave portion 45b. Therefore, the voltage-regulating device 58 is small.

Further, both surfaces of each of the terminals 45a corresponding to the insert conductors are exposed at the portions in which the terminals 45a are electrically connected to the capacitor body 43, the resistor 44, and the device main body 19. Therefore, by sandwiching the welded portions 55 and applying a high pressurizing force thereto by the so-called direct welding, the terminals 45a, and the capacitor body 43, the resistor 44, and the device main body 19 are firmly connected to each other.

At the portions in which the terminals 45a corresponding to the insert conductors are connected, the projections projecting toward the capacitor body 43, the resistor 44, and the device main body 19 are formed. Therefore, the reliability provided by the direct welding is improved.

Similar effects can be obtained also by forming projections on the capacitor body 43, the resistor 44, and the device main body 19.

On the surface of the molded body 45A, which is opposite to the side where the capacitor body 43 is provided, the concave portion 45b for housing the device main body 19 is formed. Therefore, the device main body 19 is housed in the concave portion 45b in the assembly steps and simultaneously, is provided at a predetermined position on each of the molded body 45A. As a result, workability in welding of the insert conductors and the terminals 19a of the device main body 19 is improved.

Moreover, the heat sink 18 is provided so as to cover the concave portion 45b of the molded body 45A and to abut against the device main body 19. Therefore, heat-dissipation performance of the device main body 19 is improved. At the same time, the heat sink 18 also has a function as a bottom cover when the insulating resin is injected into the concave portion 45b.

Second Embodiment

Figure 15:
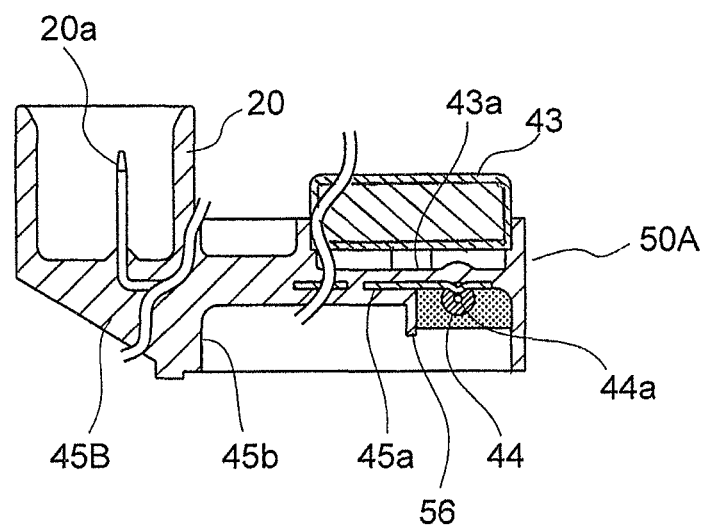
FIG. 15 is a sectional view (corresponding to FIG. 5) illustrating a regulating-device half body of the vehicle AC generator (of a type without a regulator) according to a second embodiment of the present invention.
Figure 16:
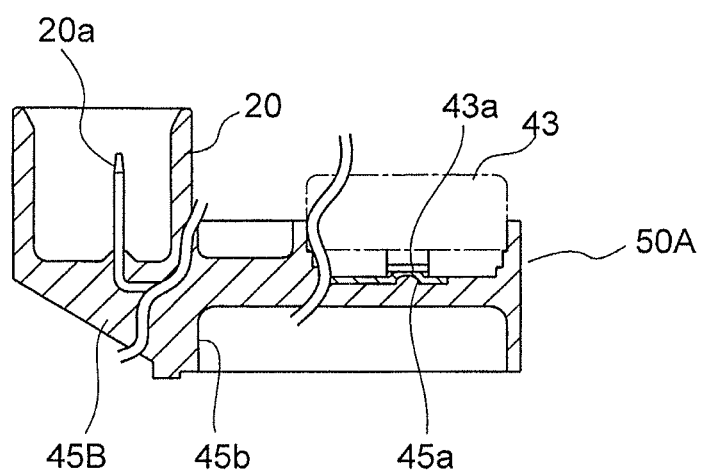
FIG. 16 is a sectional view (corresponding to FIG. 6) illustrating a regulating-device half body of the vehicle AC generator (of a type without a regulator) according to a second embodiment of the present invention.

Each of FIG. 15 and FIG. 16 is a sectional view illustrating a regulating-device half body 50A of the vehicle AC generator 1 according to a second embodiment of the present invention.

The regulating-device half body 50 of the first embodiment has exposed portions 59 (FIG. 6; welded portions) in which both surfaces of the terminals 45a are exposed in the positions at which the molded body 45 is welded. On the other hand, in a molded body 45B of the regulating-device half body 50A of this embodiment, only any one of the surfaces of each of the terminals 45a is exposed at each of the welded positions.

The remaining configuration is the same as that of the vehicle AC generator of the first embodiment.

Figure 17:
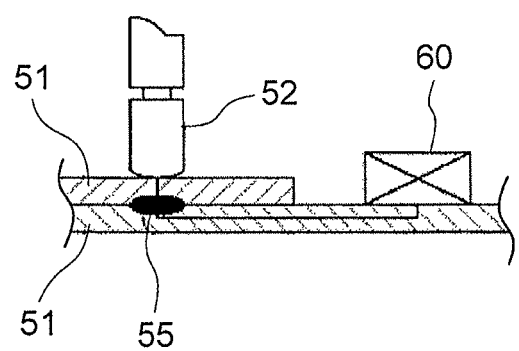
FIG. 17 is a schematic view explaining indirect welding.

In the case of the regulating-device half body 50A, the terminals 43a of the capacitor body 43 and the leads 44a of the resistor 44 are placed so as to be respectively overlapped with the above-mentioned exposed portions of the terminals 45a of the molded body 45B on one side. By indirect welding illustrated in FIG. 17, the terminals 43a and the leads 44a, and the terminals 45a are electrically connected to each other.

The indirect welding is a method as follows. The two metal plates 51 are overlapped with each other. A current is caused to flow between the electrode 52 and a feeder terminal 60, while the one electrode 52 provided on the portion in which the metal plates 51 are connected is pressurized. By using resistance heat-generation, the welded portions 55 are formed at the contact points.

As a position at which the feeder terminal 60 is mounted in the case of the indirect welding, another of the exposed portions of the terminals 45a, for example, the portion B5, E1, or the like illustrated in FIG. 9 can be used.

According to the vehicle AC generator 1 of this embodiment, only one surface of each of the insert conductors, which are connected to the capacitor body 43 and the resistor 44, is exposed. Therefore, even under bad conditions under which a large amount of water or mud adheres, the exposed area of the terminals 45a is smaller. Therefore, the reliability becomes higher.

Although a high pressurizing force cannot be applied as in the case of the direct welding used in the first embodiment, which is performed with the welded portion being interposed between the metal plates, one side of each of the welded portions of the terminals 45a can be prevented from being exposed. Therefore, the configuration of the molded body 45B has a high degree of freedom. In addition, the above-mentioned configuration is particularly effective for types of vehicle devices, which are, for example, likely to come into contact with water vertically in FIGS. 15 and 16.

In the second embodiment described above, the so-called vehicle AC generator 1 without a regulator has been described. However, it is apparent that the second embodiment is applicable to the vehicle AC generator 1A with a regulator.

Moreover, as the welding method, the capacitor terminals 43a and the leads 44a are both welded by the direct welding in the first embodiment, whereas the capacitor terminals 43a and the leads 44a are both welded by the indirect welding in the second embodiment. However, a method suitable for each of the portions may be used as appropriate and therefore, the welding methods are not limited to those described above.

Further, although the vehicle AC generators 1 and 1A have been described in the embodiments, it is apparent that the present invention is applicable to generators other than those for vehicle.

What is claimed is:

1. An AC generator, comprising: a stator around which a stator winding is wound;
   a rotor around which a rotor winding is wound, for inducing an AC electromotive force in the stator winding by rotational driving thereof;
   a rectifier for converting the AC electromotive force into a DC output voltage; and
   a molded body including an insert conductor, the molded body having approximately the same outer shape both in a case where a device main body having a function of regulating a magnitude of the DC output voltage is provided in the AC generator and a case where the device main body is not provided in the AC generator but is provided in a control device, wherein:
   on a front surface side of the molded body, a capacitor body including a capacitor element built therein is electrically connected to the insert conductor; and
   on a rear surface side of the molded body, opposite to the front surface side, a resistor is electrically connected to the insert conductor only when the device main body is not provided in the AC generator, and the device main body is electrically connected to the insert conductor only when the device main body is provided in the AC generator.

2. The AC generator according to claim 1, wherein:
   the capacitor body and the resistor are provided so as to face each other; and
   a connection portion at which the capacitor body and the insert conductor are electrically connected to each other is provided on an outer side of a connection portion at which the resistor and the insert conductor are electrically connected to each other, as viewed in plan view.

3. The AC generator according to claim 2, wherein one of the insert conductor and each of the capacitor body, the resistor, and the device main body includes projections formed thereon at the connection portions, the projections projecting to another side.

4. The AC generator according to claim 1, wherein:
   the capacitor body and the device main body are provided so as to face each other; and
   a connection portion at which the capacitor body and the insert conductor are electrically connected to each other is provided on an outer side of a connection portion at which the device main body and the insert conductor are electrically connected to each other, as viewed in plan view.

5. The AC generator according to claim 1, wherein both surfaces of the insert conductor are exposed in connection portions at which the insert conductor is electrically connected to the capacitor body, the resistor, and the device main body.

6. The AC generator according to claim 1, wherein only one surface to be bonded of the insert conductor is exposed in connection portions at which the insert conductor is electrically connected to the capacitor body, the resistor, and the device main body.

7. The AC generator according to claim 1, wherein the molded body includes a concave portion for housing the device main body therein, which is formed on the another surface side of the molded body.

8. The AC generator according to claim 7, further comprising a heat sink for covering the concave portion, which is provided so as to be held in surface contact with the device main body.

9. The AC generator according to claim 1, wherein the AC generator comprises a vehicle AC generator.

10. The AC generator according to claim 1, wherein the capacitor body is provided on the front surface side, and
    wherein the resistor is provided on the rear surface side only when the device main body is not provided in the AC generator, and the device main body is provided on the rear surface side only when the device main body is provided in the AC generator.

11. An AC generator, comprising:
    a stator around which a stator winding is wound;
    a rotor around which a rotor winding is wound, for inducing an AC electromotive force in the stator winding by rotational driving thereof;
    a rectifier for converting the AC electromotive force into a DC output voltage; and
    a molded body for accommodating either of:
      a first insert conductor configured to be connected to a DC output voltage regulator; or
      a second insert conductor configured to be connected to a resistor,
    wherein the molded body comprises the first insert conductor when the DC output voltage regulator is provided in the AC generator and comprises the second insert conductor when the DC output voltage regulator is provided separately from the AC generator, and
    wherein the molded body has approximately the same outer shape when the molded body comprises the first insert conductor and when the molded body comprises the second insert conductor.

* * * * *